US005668990A

United States Patent [19]

Bajorinas et al.

[11] Patent Number: 5,668,990

[45] Date of Patent: Sep. 16, 1997

[54] APPARATUS AND METHOD FOR GENERATING 100% UNITED STATES POSTAL SERVICE BAR CODED LISTS

[75] Inventors: Andrew P. Bajorinas, Stamford; Gabriel E. Pettner, Orange, both of Conn.

[73] Assignee: Pitney Bowes Inc., Stamford, Conn.

[21] Appl. No.: 413,653

[22] Filed: Mar. 30, 1995

[51] Int. Cl.[6] .............................. G06F 3/03; G06F 3/06; G06F 3/12; G06F 12/04

[52] U.S. Cl. .................... 395/615; 235/462; 364/478.09; 364/DIG. 1; 364/DIG. 2; 705/408; 705/401

[58] Field of Search .............................. 395/800, 200.03, 395/600, 615, 208, 214, 209, 442; 64/DIG. 1, DIG. 2, 464.02, 464.03, 464.19, 478.09, 464.16; 235/381, 462, 437, 383, 472, 449; 341/106; 360/98.04, 113

[56] References Cited

U.S. PATENT DOCUMENTS

| | | | |
|---|---|---|---|
| 4,858,907 | 8/1989 | Eisner et al. | 271/124 |
| 4,868,570 | 9/1989 | Davis | 341/106 |
| 4,868,757 | 9/1989 | Gil | 364/464.03 |
| 5,008,827 | 4/1991 | Sansone et al. | 364/464.02 |
| 5,051,914 | 9/1991 | Sansone et al. | 364/478 |
| 5,065,000 | 11/1991 | Pusic | 364/464.03 |
| 5,079,714 | 1/1992 | Manduley et al. | 364/478 |
| 5,326,181 | 7/1994 | Eisner et al. | 400/104 |
| 5,341,505 | 8/1994 | Whitehouse | 395/800 |
| 5,377,120 | 12/1994 | Humes et al. | 364/478 |

*Primary Examiner*—Daniel H. Pan
*Attorney, Agent, or Firm*—Melvin J. Scolnick; David E. Pitchenik; Robert H. Whisker

[57] ABSTRACT

The invention is a method and apparatus for generating a coded address list. The method is initiated by inputting an address list to a data processing device which then reads each address record on the address list. As an address record is read, a set of rules is applied to the record to determine whether or not a corresponding bar code can be assigned. If a bar code can be assigned, then the data processing device writes the address record and its corresponding bar code to a first list. If, however, a corresponding bar code is not determined for an address record, then the unmatched address record is posted to a second list. The first list is output for printing, while the second list is saved to memory. With respect to the second list, the system operator can: manually correct an address record on the list; delete the address record; or, output the address record to a printer for non-discounted mailing. The apparatus for generating the coded address lists comprises data processing means for accepting the address list and for accepting a set of postal service rules for coding the address records on the list. The data processing means has a memory for storing the postal service rules, and coding means for coding the address records. Additionally, the apparatus has compiler means for compiling the lists of coded and non-coded address records; and, output means for outputting the coded list for printing, and further for outputting a report.

9 Claims, 5 Drawing Sheets

APPARATUS AND METHOD FOR GENERATING 100% UNITED STATES POSTAL SERVICE BAR CODED LISTS

RELATED APPLICATION

Reference is made to U.S. patent application Ser. No. 08/413,579, entitled A METHOD AND SYSTEM FOR MINIMIZING ATTRIBUTE NAMING ERRORS IN SET ORIENTED DUPLICATE DETECTION, assigned to the assignee of this application and filed contemporaneously herewith.

BACKGROUND OF THE INVENTION

The postal service has long provided alternatives to the basic first class rates for various classes of mail. For customers willing to wait a little longer for certain types of mail to arrive at a destination, there are third class and fourth class rates. For a customer shipping in bulk there are discounted rates. Additionally, the postal service will grant discounts to customers who are willing to make the flow of mail easier for the postal service.

The rapid growth in computer driven technology in the recent past, has produced better methods and better apparatus for the handling of mail. Thus, the use of zip codes to move the mail has evolved so as to create efficiencies from the expansion of the zip code field and the use of corresponding bar codes. The Post Net bar code is an example of a United States Postal Service (U.S.P.S.) initiative to provide efficient routing of mail pieces through the use of scanning and routing mechanisms that can read a bar code on a mail piece and quickly route that mail piece to its intended destination. In order to encourage its customers to employ the use of correct addressing, Zip +4, and Post Net bar coding, the U.S.P.S. offers discounts that generally pay their customers back for the cost of upgrade in a relatively short period of time. The greater the volumes of mail, the greater the marginal utility to be achieved.

The Post Office currently utilizes automated mail sorters which sort envelopes on the basis of a zip code encoded as an imprinted machine readable bar code. To be acceptable for use, the encoded bar code must meet strict specifications as to size, spacing of parallel bars, and placement upon the envelope. Accordingly, there is a need for accurate, but relatively inexpensive addressing or printing systems that will print bar codes at the same time that they print the legible address.

As the United States Postal Service, together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the United States, Postal Service regulations provide for a "Postnet" bar code which represents the five, nine, or eleven digit zip code of the destination address in a machine readable form.

Systems have been used or proposed to meet the need to produce mail pieces imprinted with the Postnet bar code, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. This patent teaches a method of addressing substrates with a human readable address containing a zip code and a bar code corresponding to the zip code. The method utilizes a computer and comprises several steps. These steps include: receiving in the computer a plurality of addresses, with pre-existing zip code information contained in each as complete address data, and requiring no manual inputting or identification; automatically scanning the address data in the computer to find the pre-existing zip code; automatically converting, in the computer, the pre-existing zip code into a line of corresponding bar code; and, essentially simultaneously printing the complete address, including zip code information and corresponding bar code, on a substrate, under control of the computer so that the substrate produced has human readable zip code and machine readable bar code information thereon.

Both of the Eisner et al. patents (U.S. Pat. Nos. 4,858,907 and 5,326,181) address the specific need of mailers to reduce costs by utilizing a Post Net bar code when printing to a mail piece.

U.S. Pat. No. 5,377,120 for an APPARATUS FOR COMMINGLING AND ADDRESSING MAILPIECES, issued Dec. 27, 1994, to Humes et al., is concerned primarily with preparing a plurality of pre-printed, unaddressed, non-alike mail pieces from pre-determined sources into grouped bundles organized in a manner to receive low postal rates. Indeed, Humes et al. goes on to state that: "Due to automation, lower postal rates are available for mail pieces which are addressed with machine readable addressing such as bar codes or the like . . . a minimum number of pieces must be in each grouping to qualify for the lower postal rates."

An example of a typical prior art system can be found in FIG. 2, herein. In FIG. 2, an example of the flow of steps in the prior art method for the coding of address records is shown. The flow begins at step 60 when an address list is prepared for use in a mailing. The address list contains one or more address records and its format can be any of the commercially available formats that is appropriate to the task. The method advances to step 62 where an individual address record is read from input address list 64 before advancing to step 66 where the address and zip code lines are parsed by the system, and then the rules and algorithms for determining a bar code that corresponds to the address are obtained from postal service database 68 to produce a corresponding bar code. A new record consisting of the old address record plus a corresponding bar code, if one was determined, is written to output list 72 at step 70.

Once the new address record has been written to the output list, the method advances to step 74 and queries as to whether or not the record just read and re-written is the LAST RECORD? If the answer to the query at step 74 is "NO," then the method advances to step 76 and proceeds to step 62 to read the next record on input address list 64. If, however, the response to the query at step 74 is "YES," then the method will generate at step 78, CASS report 80 for the output list; the CASS report is further discussed hereinbelow. After generation of CASS report 80, the method advances to step 82 to complete and then exit from the coding sequence.

Thus, while Humes et al. offers an apparatus to commingle address lists and produce grouped bundles for delivery at the lowest postal rates, and the Eisner patents detail the benefits of bar code use, these patents are representative of a short-coming that exists in the prior art with respect to the use of address lists.

Address lists are comprised of address records. Each record contains a number of elements that are converted to a machine readable bar code using postal service rules (algorithms). Invariably in large lists, there are a number of address records on the address list which contain data that can not be converted to a usable bar code. The use of the Post Net code, or the various coding schemes of the different postal services, is only as efficient as the address list to which the coding is applied. Thus, a mass mailing that utilizes an address list with addresses that are not convertible to the proper bar code lacks efficiency, because the separation of the mail pieces will still be required to qualify for the lower postal rates.

Therefore, it is an object of the present invention to provide a method and apparatus for generating a 100% coded list that will allow shippers using the postal service to get the greatest possible benefit from the discounts that can be applied to a mailing derived from such a list.

SUMMARY OF THE INVENTION

According to the invention, the object is achieved and the disadvantages of the prior art are overcome by a method and apparatus for generating coded address lists.

The method comprises a number of steps. These steps include inputting an address list to a data processing device where the device may be resident in a host computer or within a "smart" printer. The data processing device would read an address record, and then any subsequent records, from the address list. Once the address record has been read, a set of rules is then applied to the record to determine whether or not a bar code corresponding to that address record can be assigned.

If a bar code can be assigned to an address record, then the data processing device writes the address record and its corresponding bar code to a second record which is placed on a list. The process is then repeated for any subsequent address records remaining on the address list. If, however, a corresponding bar code is not determined for an address record, then the unmatched address record is posted to a second list.

The method then outputs the first list to the language interpreter of a printer while retaining the second list in a memory of the data processing device. The method can then generate a report, if required, with details concerning the first list.

The printer will accept the outputted first list, and print the individual address records of the list on a substrate together with additional non-address data such as graphics.

With respect to the saved second list of non-coded addresses, the system operator is given several options depending upon the goals of the mailing to be conducted. The system operator can manually correct an address record on the second list by: (i) including a corresponding bar code; (ii) transferring the corrected address record to the first list; and, (iii) retaining the address records that are not corrected. The operator can then delete the address record from the second list; or output the address record to a printer for non-discounted mailing.

The apparatus for generating the coded address lists comprises a plurality of means for executing the invention's method. The apparatus has data processing means for accepting the address list to be coded and further for accepting a set of postal service rules for coding the one or more address records.

The data processing means has memory means for storing the set of postal service rules and coding means for coding the address records by reading the records and applying the postal service rules thereto to determine a corresponding bar code.

Additionally, the apparatus comprises: compiler means for compiling a list of the coded address records and for compiling a second list of the address records for which a corresponding bar code could not be determined; output means for outputting the coded list to a printer language interpreter; and a second output means for outputting a report, if required.

BRIEF DESCRIPTION OF THE DRAWINGS

FIG. 4 is a flowchart of the method for handling the alternative actions that the 0% coded list can be subjected to.

DETAILED DESCRIPTION OF THE PREFERRED EMBODIMENTS

Figure 1A:
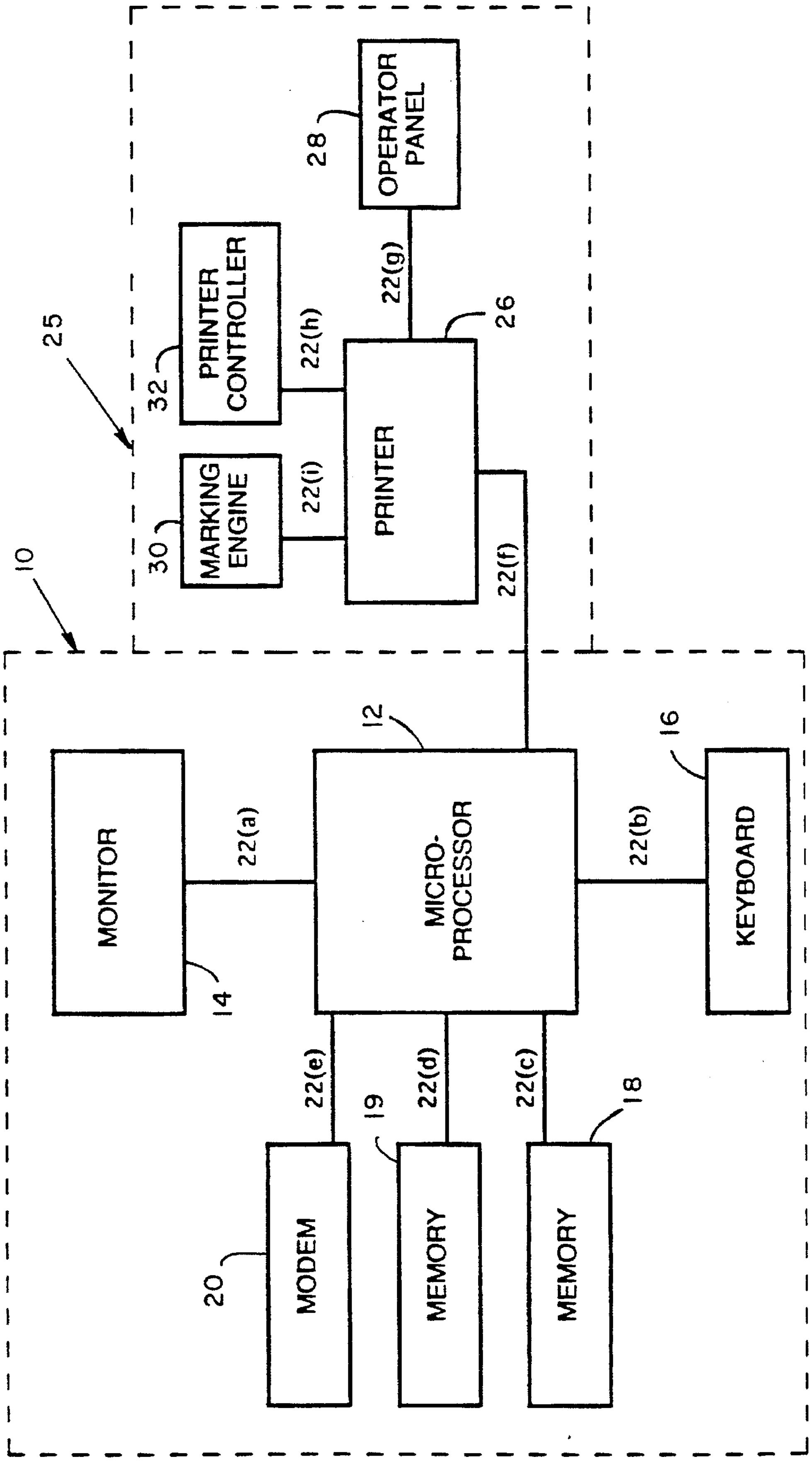
FIG. 1A is a block diagram of an addressing or mailing system that could utilize the subject invention.

Turning to FIG. 1, there are depicted in block form two subsets that, combined, form an addressing system.

Addressing subsystem 10 includes: microprocessor 12 connected to monitor 14 by interface cable *22a;* keyboard 16 connected to microprocessor 12 by interface cable *22b;* memory 18 operatively connected to microprocessor 12 at *22c;* memory 19 operatively connected to microprocessor 12 at *22d;* modem 20 connected to microprocessor 12 by interface cable *22e;* and interface cable *22f* for connection to addressing subsystem 25.

Addressing subsystem 25 includes: printer 26 connected to addressing subsystem 10 by interface cable *22f;* operator panel 28 operatively connected to printer 26 at *22g;* printer controller 32 operatively connected to printer 26 at *22h;* and, marking engine 30 operatively connected to printer 26 at *22i.*

Figure 1B:
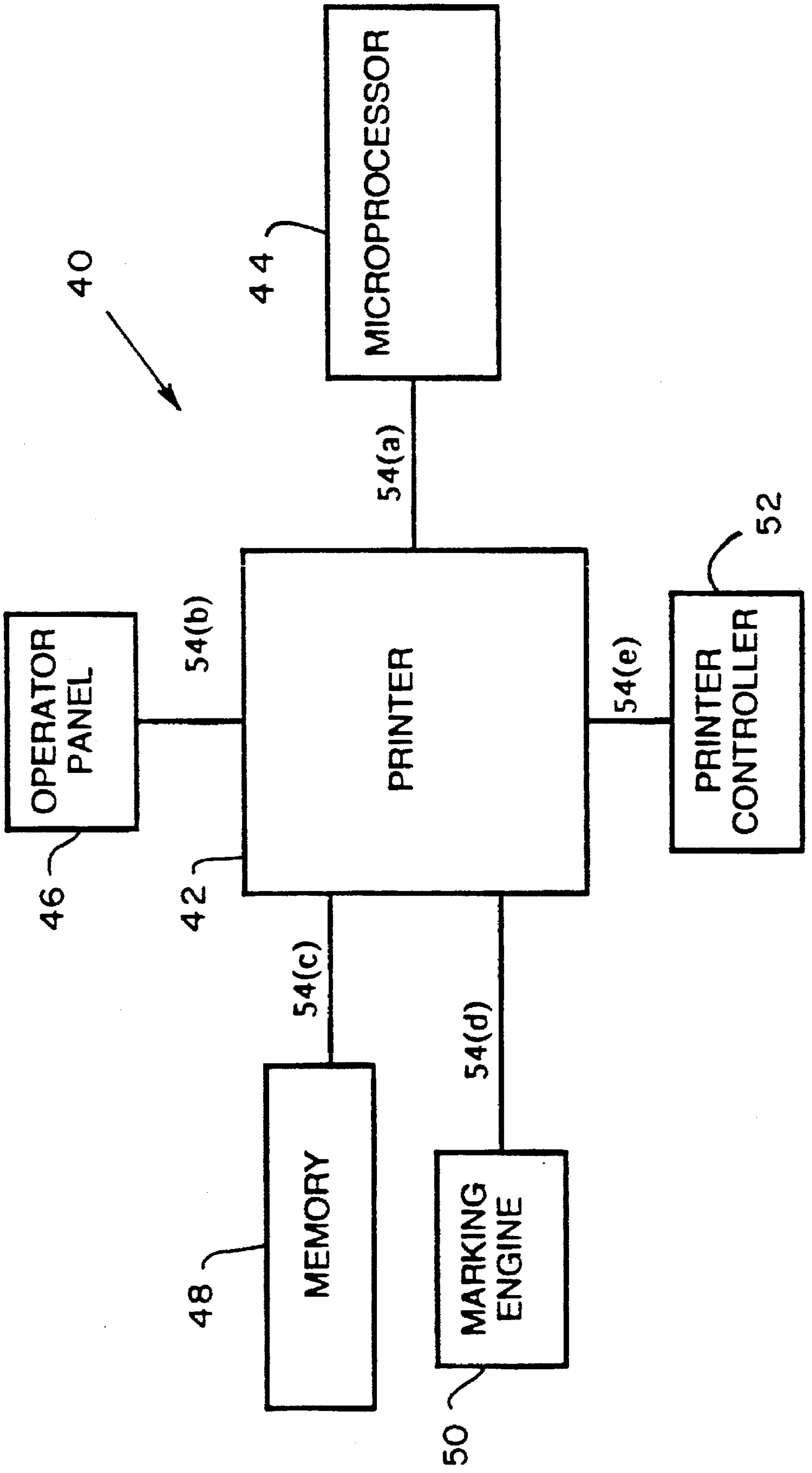
FIG. 1B is a block diagram of an alternative embodiment of the addressing or mailing system that could utilize the subject invention.

A microcomputer, or any computer that can download data that can be printed on a printer whether that printer is a peripheral device of the computer or not, uses application programs for creating data. These are resident in the microcomputer ROM memory and in memory 18; memory 19 is utilized for the storing of address lists. The printers commonly utilized in the addressing art may also contain a microprocessor that is able to assign bar code data to addresses that are delivered from the host. These so-called "smart" printers vary in their ability to process data. FIG. 1B is a block diagram of an alternative embodiment of the invention that is based on a smart printer.

Turning to FIG. 1B, system 40 is depicted as comprising: printer 42 which is operatively connected to microprocessor 44 at 54*a;* operator panel 46 operatively connected to printer 42 at 54*b;* memory 48 operatively connected to printer 42 at 54*c;* marking engine 50 operatively connected to printer 42 at 54*d;* and, printer controller 52 operatively connected to printer 42 at 54*e*.

Figure 2:
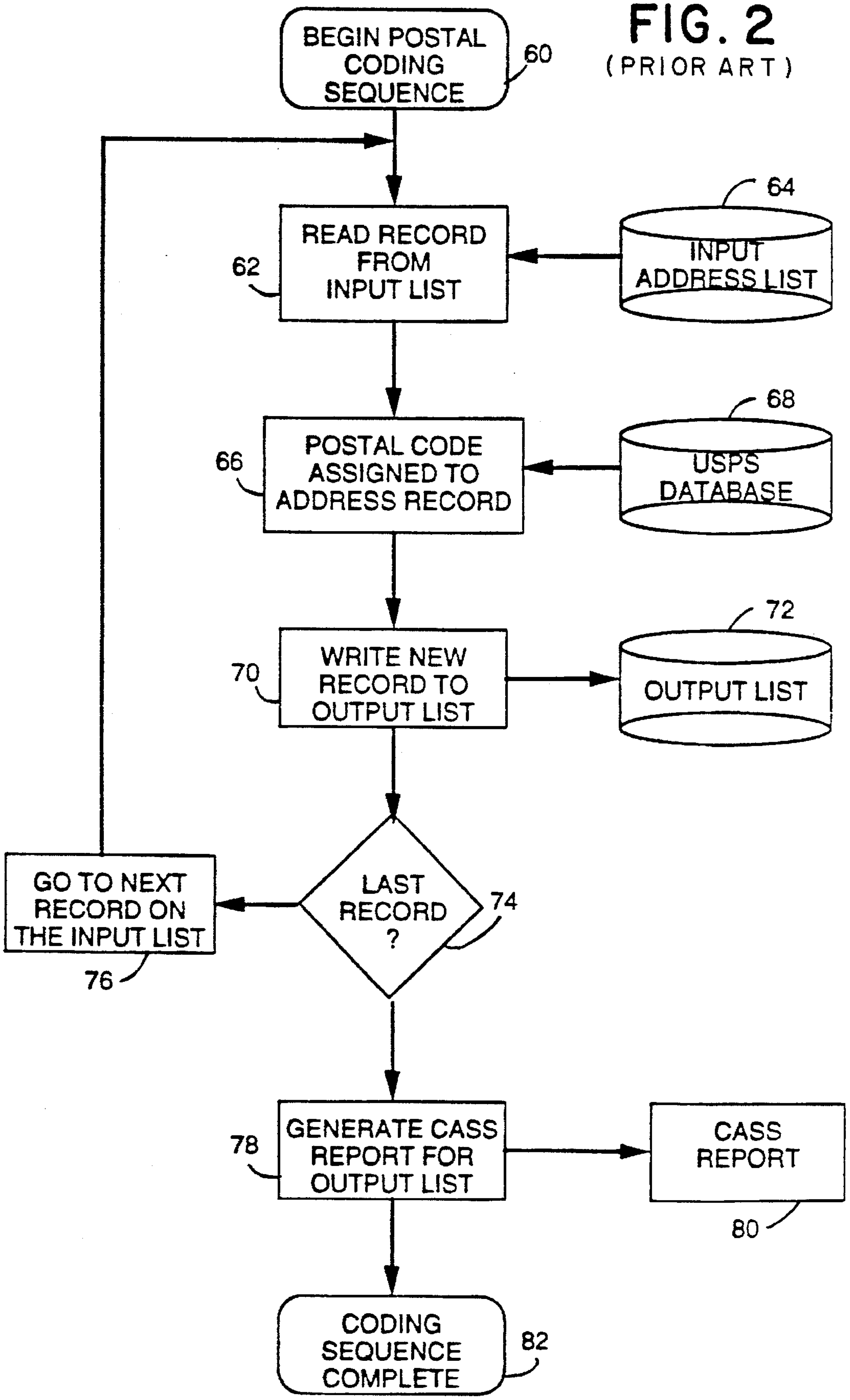
FIG. 2 (PRIOR ART)
FIG. 2 is a flowchart of the prior art assigning bar codes to address records prior to output for printing.

FIG. 2, which details an example of the prior art, was discussed hereinabove in the Background of the Invention.

Figure 3:
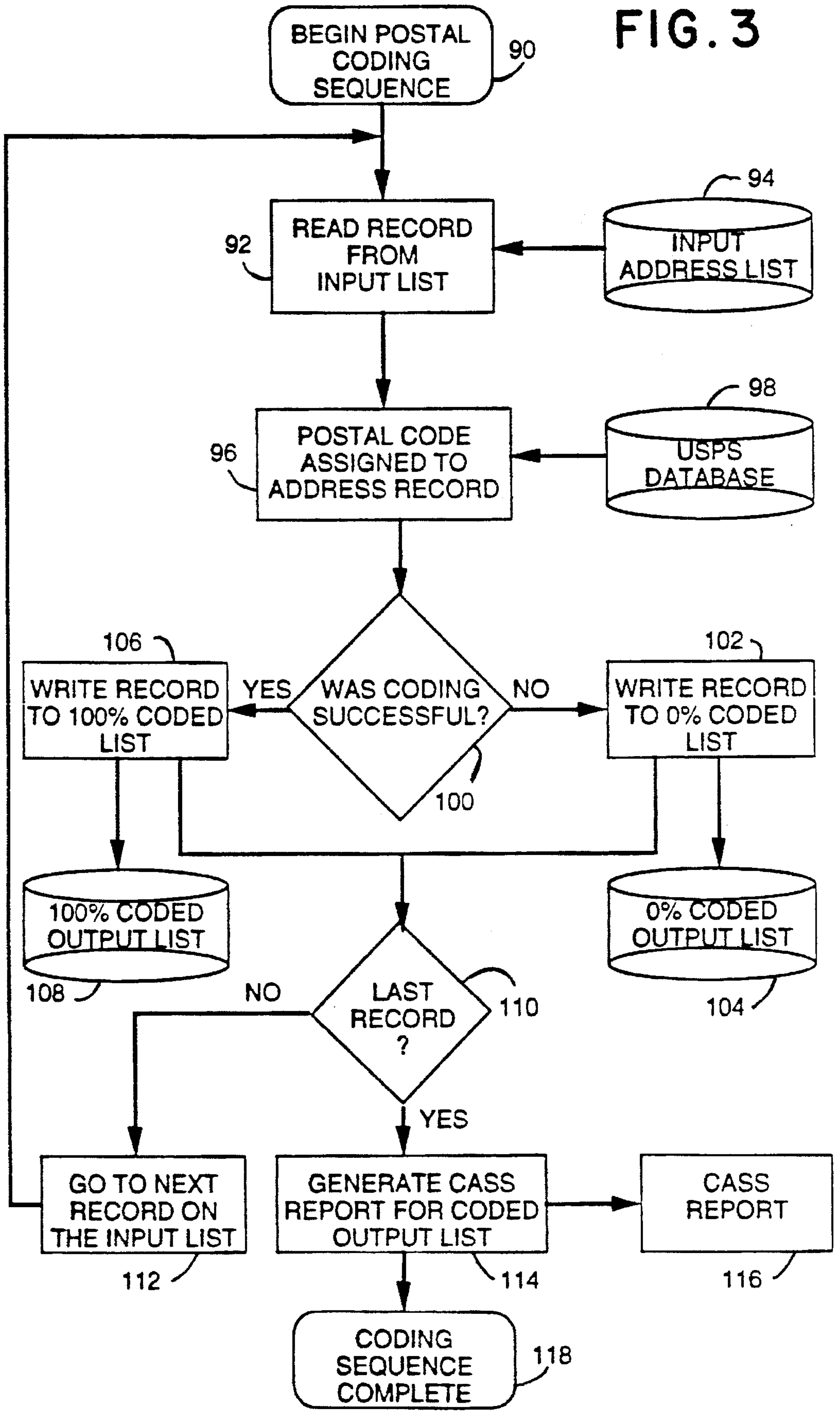
FIG. 3 is a flowchart of the preferred embodiment of the subject invention.

Turning to FIG. 3, the method flow begins at step 90 when an address list is prepared for use in a mailing. The address list contains one or more address records. The method advances to step 92 where an individual address record is read from input address list 94 before advancing to step 96 where the address and zip code lines are parsed by the system, and then the rules and algorithms for determining a bar code that corresponds to the address are obtained from postal service database 98 to determine whether or not a corresponding bar code can be produced for the address record.

The postal service rules for bar coding center around the ability of the addressing system to separate out a postal zip code from the address field. The use of a proper zip code within the address field makes the determination of a corresponding bar code a reality. The elements of a postal zip code consist of four parts; these are: (i) the "zip code," which consists of 5 digits and refers to geographic area or zone; (ii) the "zip plus 4" further breaks down a zip code region into smaller sub-regions, this consists of four digits added to the base zip code; (iii) "delivery point digits" which consist of two additional digits that further break down a zip plus 4 so that the U.S.P.S. can more accurately pin point an exact location; and, (iv) a check sum digit. The delivery point digits are abstracted from the street line of the address using the approved algorithm of the postal service.

Once the system has attempted to determine a corresponding bar code, the subject method then queries at step 100 as to whether or not the coding was successful. If the response is "YES," then the address record, together with its bar code, is written at step 106 to a new list, thus resulting in a list that is 100% postal service coded. If the response to the query at step 100 is "NO," then the non-coded record is written at step 102 to a third list, thus resulting in a list that is 0% postal service coded.

After writing the address record to one of the two new lists (100% coded or 0% coded), the method advances to step 110 where the method queries as to whether or not the address record just written is the LAST RECORD? If the answer to the query at step 110 is "NO," then the method advances to step 112 and proceeds to step 92 to read the next record on input address list 94. If, however, the response to the query at step 110 is "YES," then the method will generate at step 114, CASS report 116 (the CASS report is described further hereinbelow) for the output list. After generation of CASS report 116, the method advances to step 118 to complete and then exit from the coding sequence.

Coding Accuracy Support System (or, CASS) reports are a requirement of the United States Postal Service (U.S.P.S.) to maintain CASS certification. The system improves the accuracy of Delivery Point codes, Zip +4 coding, five digit zip coding, and carrier routing that appears on mail pieces. This is accomplished by the U.S.P.S. providing to service bureaus, commercial mailers, and software vendors a common platform for measuring the quality of address matching software and then furnishing useful diagnostics to correct the software deficiencies. In general, for mailers to claim Automation Compatible discounts of any type, the list must be Postal Coded for CASS certified software, and with each mailing a CASS report must also be submitted to the U.S.P.S.

After the method has completed the flow of FIG. 3, the system operator is left with two new lists. The first list contains one or more address records, all of which are postal service coded; this list is then transmitted to printer controller 32 for printing by marking engine 30 to a substrate together with any additional data or graphics that are required or desired. The second of the new lists contains address records for which no bar code could be determined. The second list then can be acted upon in several ways.

Figure 4:
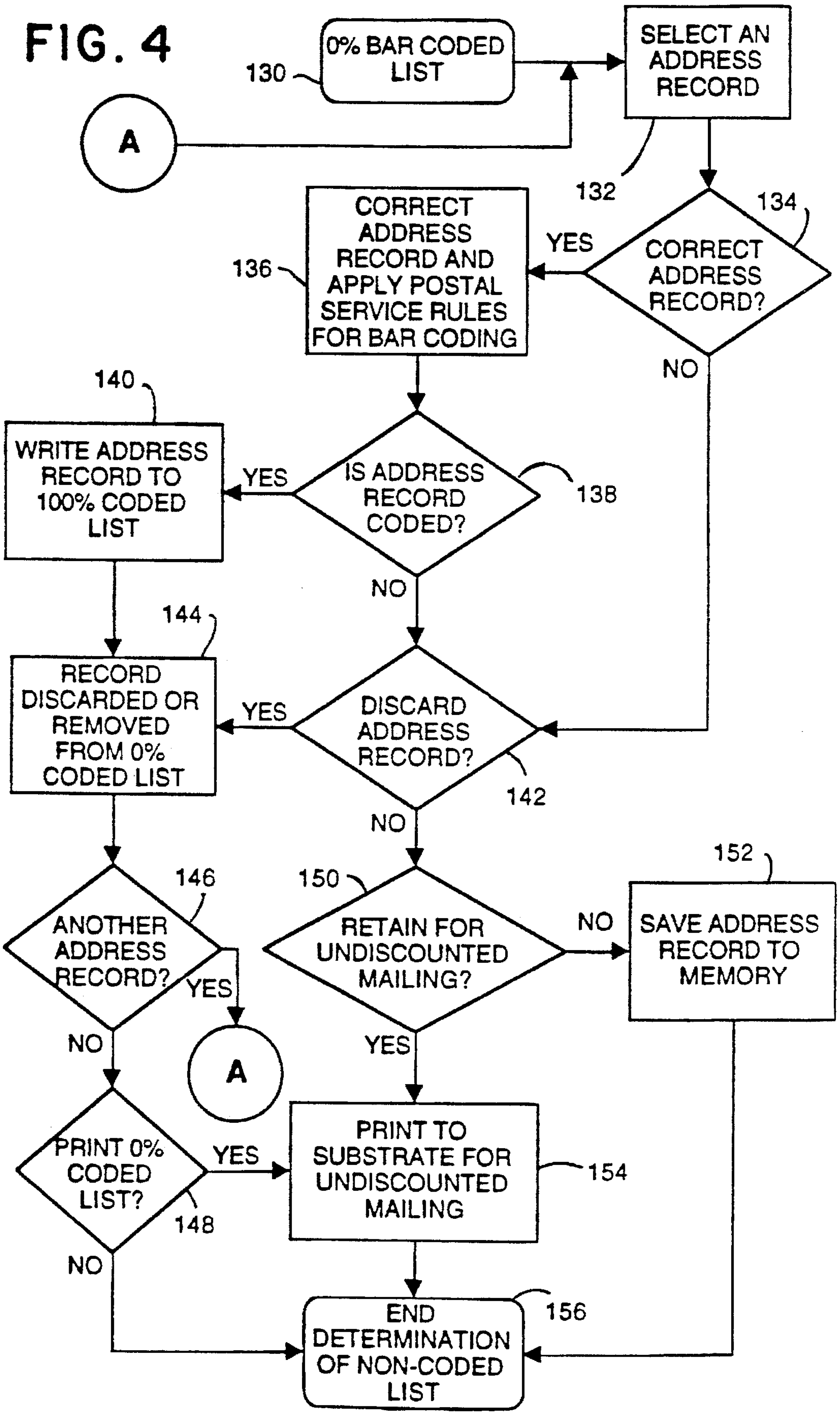

Turning to FIG. 4, there is shown a flow of the actions which can be utilized for the non-coded address records (or 0% coded list) of the second new list. Once the 0% coded list has been determined at step 130, the flow advances to step 132 for selection of an address record from the list. The method poses a query at step 134 which asks the system operator whether or not the system operator wants to correct the selected address record. If the response to the query is "NO," then the method advances to step 142; otherwise, if the response to the query at step 134 is "YES," then the method advances to step 136 to correct the address and attempt to apply the postal service rules for bar coding. After step 136, the system advances to step 138 and queries as to whether the correction made at step 136 resulted in a coded address record. If the response to the query at step 138 is "NO," then the method advances to step 142; otherwise, if the response to the query at step 138 is "YES," then the method advances to step 140 and writes the corrected address record to the 100% coded list.

After the corrected address record is written to the 100% coded list at step 140, the method advances to step 144. Step 144 may also be reached from step 142, where the method determines whether or not the uncoded address record is to be retained or discarded. If the decision is made to discard or remove the address record from the 0% coded list then the method advances to step 144; otherwise, the method advances to step 150.

At step 144, the address record is discarded or removed from the 0% coded list; the method then queries at step 146 as to whether or not there are additional records to be selected for possible correction. If the response to the query at step 146 is "YES," the method path then returns from step 146 to enter at step 132 where a new address record can be selected for possible correction. If, however, the response to the query at step 146 is "NO," then the method advances to step 148 and queries as to whether or not there is an uncoded list for printing. If the response is "YES," then the method advances to step 154 and prints the remaining contents of the list to one or more substrates as predetermined by the printer programming. If there are no longer any address records remaining on the 0% coded list, which would cause a "NO" response to the query at step 148, then the method advances to step 156 and ends the correction/determination sequence.

Returning to step 150, the method queries as to whether the 0% coded list, now consisting of undiscarded records, is to be retained for use with an undiscounted mailing. If the response to the query is "YES," then the method advances to step 154 and prints the remaining contents of the list to one or more substrates as predetermined by the printer programming. Step 154 then advances to step 156 and ends the correction/determination sequence.

If the response at step 150 is "NO," however, then the method advances to step 152 and saves the remaining address records for future determination or correction. Step 152 then advances to step 156 and ends the correction/determination sequence.

As can be appreciated by those skilled in the art, a number of variations of the subject invention are possible. These variations include, but are not limited to: the ability of the printer employed within the system; the steps for handling the non-coded address record list which can be altered depending upon the target recipient group for the mailing being conducted; the volume of the mailing can further effect discounts and contribute to the decision on how to deal with the uncoded list; the nature of the non-address data to be printed to the substrate; the substrate itself could be an envelope, a card, or a folded mailpiece; and, the ability to make corrections to an address list.

What is claimed is:

1. A method for generating coded address lists, comprising the steps of:

(a) inputting an address list to a data processing device;

(b) reading a first record, and then subsequent records if any, from said address list;

(c) applying a set of rules to said first record, and then to said subsequent records, to determine whether or not a bar code corresponds to said first record and/or to said subsequent record;

(d) writing a second record, comprising said first record, and said corresponding bar code, to a first list if a bar code is determined for said first record, or writing said first record to a second list if said corresponding bar code is not determined; said writing to continue for said subsequent records in the same manner as said first record;

(e) outputting said first list to a language interpreter of a printer;

(f) retaining said second list in a memory of said data processing device; and (g) generating a report in respect of said first list.

2. The method of claim 1, wherein said printer will accept said outputted first list, and print the individual address records of said first list on a substrate.

3. The method of claim 2, wherein said printer accepts said outputted first list together with additional non-address data to be printed with each individual address record to a substrate.

4. The method of claim 1, wherein said data processing device is resident within said printer.

5. The method of claim 1, wherein said data processing device is resident in a host computer exclusive of said printer.

6. The method of claim 1, wherein a system operator is given an option to:

(a) manually correct an address record on said second list, said correction comprising the steps of:

(i) including a corresponding bar code;

(ii) transferring said corrected address record to said first list; and (iii) retaining said address records that are not corrected;

(b) delete said address record from said second list; or (c) output said address record to a printer for non-discounted mailing.

7. Apparatus for generating coded address lists, comprising:

(a) data processing means for accepting an address list to be coded, said address list comprised of one or more address records, said data processing means further for accepting a set of postal service rules for coding said one or more address records;

(b) first memory means for storing said set of postal service rules;

(c) coding means for coding said address records by reading said one or more address records and applying said postal service rules thereto to determine a corresponding bar code;

(d) compiler means for compiling a list of said coded address records, said compiler means compiling a list of address records for which a corresponding bar code could not be determined;

(f) first output means for outputting said coded list to a printer language interpreter; and (g) second output means for outputting a report in respect of said coded list.

8. The apparatus of claim 7, wherein said data processing means is resident within a printer comprising printing means for printing said coded list.

9. The apparatus of claim 7, wherein said data processing means is resident within a host data processing device.

* * * * *